L. S. HILL.
Spoon-Bait Hook.
No. 211,906. Patented Feb. 4, 1879.
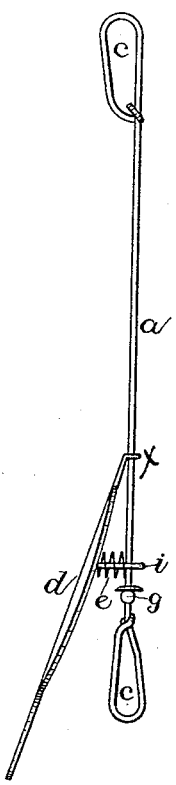
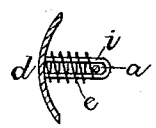
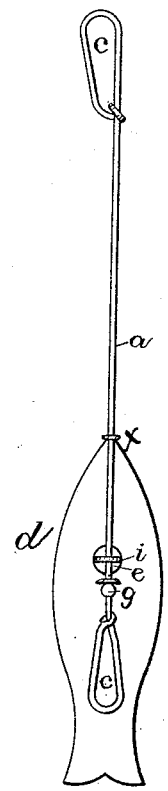
Witnesses:
J. W. Garner
W. S. D. Haines
Inventor:
Lysander S. Hill
per F. A. Lehmann
Atty

UNITED STATES PATENT OFFICE.

LYSANDER S. HILL, OF GRAND RAPIDS, MICHIGAN.

IMPROVEMENT IN SPOON-BAIT HOOKS.

Specification forming part of Letters Patent No. 211,906, dated February 4, 1879; application filed August 22, 1878.

*To all whom it may concern:*

Be it known that I, LYSANDER S. HILL, of Grand Rapids, in the county of Kent and State of Michigan, have invented certain new and useful Improvements in Spoon-Baits; and I do hereby declare the following to be a full, clear, and exact description of the invention, such as will enable others skilled in the art to which it pertains to make and use it, reference being had to the accompanying drawings, which form part of this specification.

My invention is intended as an improvement upon the Letters Patent No. 177,639, for spoon-bait, granted to me May 23, 1876; and it consists in the combination, with the rod and spoon, of a U-shaped guide rigidly secured to the spoon, and having the rod passing through the same, and a spiral spring passing around the guide between the spoon and rod, and entirely disconnected from them, as will be hereinafter more fully set forth.

In the annexed drawings, Figure 1 is a side view, and Fig. 2 a rear view, of a spoon-bait embodying my invention. Fig. 3 is a detailed view of a part thereof.

$a$ represents the wire or rod, having a loop, $c$, at each end. $d$ is the spoon, having an eye, $x$, at its upper end for the passage of the rod $a$.

On the back of the spoon $d$ is rigidly secured a guide, $i$, made of wire bent in U form, the ends of the wire being secured to the spoon, and the rod $a$ passing through said guide, as shown in Fig. 3. Surrounding the guide $i$, between the spoon $d$ and rod $a$, is a spiral or other spring, $e$, which is entirely disconnected from said parts, and yet at the same time holds the lower end of the spoon away from the rod.

In my former patent, above referred to, I employed a spring rigidly attached to the spoon, and having a hole in its lower end for the passage of the rod. This I have found objectionable, both in the manufacture and in the practical operation of the bait. The spring having the hole through it for the rod to pass through, the rod had to be of comparatively small wire; or, if the same were made heavy, the spring had to be made larger, and consequently often so strong that the bait would not operate as designed. There was also great trouble and expense, and often loss of springs, in making the holes through them.

With my present invention these difficulties are overcome. The rod $a$ can be made of any size desired, and the spring yet be as fine and delicate as the proper working of the bait will warrant. The labor and expense in manufacturing is also greatly reduced.

On the rod $a$ is a suitable stop, $g$, to limit the downward movement of the spoon by the guide $i$ coming in contact therewith.

Having thus fully described my invention, what I claim as new, and desire to secure by Letters Patent, is—

The combination, with the spoon $d$ and rod $a$, of the U-shaped guide $i$, rigidly secured to the spoon and passing around the rod, and the spring $e$, surrounding the guide between the spoon and rod, and entirely disconnected from them, substantially as and for the purposes herein set forth.

In testimony that I claim the foregoing I have hereunto set my hand this 30th day of August, 1876.

LYSANDER S. HILL.

Witnesses:
SAML. B. HORNE,
J. W. NICHOLS.